US006850856B1

(12) United States Patent
Gauthier et al.

(10) Patent No.: US 6,850,856 B1
(45) Date of Patent: *Feb. 1, 2005

(54) I/O RECEIVER THERMAL CORRECTION SCHEME

(75) Inventors: Claude R. Gauthier, Cupertino, CA (US); Shaishav A. Desai, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/299,674

(22) Filed: Nov. 18, 2002

(51) Int. Cl.[7] .......................... G06F 19/00; G01R 19/00
(52) U.S. Cl. ................................... 702/99; 327/51
(58) Field of Search .................. 702/99, 132, 130; 716/4, 6; 374/178; 703/25; 327/51

(56) References Cited

U.S. PATENT DOCUMENTS

| 5,097,303 | A | * | 3/1992 | Taguchi ........................ 365/149 |
| 5,490,059 | A | * | 2/1996 | Mahalingaiah et al. ........ 700/46 |
| 5,784,328 | A | * | 7/1998 | Irrinki et al. ................. 365/222 |
| 6,037,807 | A | * | 3/2000 | Wu et al. ...................... 327/52 |
| 6,067,508 | A | * | 5/2000 | Conn, Jr. ....................... 702/132 |
| 6,082,115 | A | * | 7/2000 | Strnad ............................ 62/3.7 |
| 6,349,269 | B1 | * | 2/2002 | Wallace, Jr. ................... 702/132 |
| 6,480,127 | B1 | * | 11/2002 | Aslan ........................... 341/119 |
| 6,662,136 | B2 | * | 12/2003 | Lamb et al. ................... 702/132 |
| 6,704,680 | B2 | * | 3/2004 | Amick et al. ................. 702/130 |

OTHER PUBLICATIONS

Tuthill, A Switch–Current, Switch–Capacitor Temperature Sensor in 0.6–microm CMOS, Jul. 1998, IEEE Journal of Solid–State Circuits, vol. 33, No. 7, pp. 1117–1122.*
Bakker et al., Micropower CMOS Temperature Sensor with Digital Output, Jul. 1996, IEEE Journal of Solid–State Circuits, vol. 31, No. 7, pp. 933–937.*
Poppe et al., Design issues of a Multi–Functional Intelligent Thermal Test Die, 2001, 17th IEEE SEMI–THERM Symposium.*
Meijer et al., Temperature Sensors and Voltage References Implemented in CMOS Technology, Oct. 2001, IEEE Sensors Journal, vol. 1, No. 3, pp. 225–234.*
Gold et al., U.S. Appl. No. 10/079,476 filed Feb. 19, 2002, entitled "A Method And System For Monitoring And Profiling An Integrated Circuit Die Temperature".

* cited by examiner

Primary Examiner—John Barlow
Assistant Examiner—Toan M. Le
(74) Attorney, Agent, or Firm—Martine, Penilla & Gencarella, LLP

(57) ABSTRACT

A system and method of adjusting an I/O receiver includes providing an amplification control parameter to the I/O receiver. A temperature of the I/O receiver is monitored and the amplification control parameter to the I/O receiver is adjusted according to the temperature of the I/O receiver.

22 Claims, 10 Drawing Sheets

I/O RECEIVER THERMAL CORRECTION SCHEME

CROSS REFERENCE TO RELATED APPLICATIONS

This application is related to U.S. patent application Ser. No. 10/079,476 filed on Feb. 19, 2002 and entitled "Method and System for Monitoring and Profiling IC Die Temperature," by inventors Spencer Gold, Claude Gauthier, Steven Boyle, Kenneth House and Joseph Siegel, which is incorporated herein by reference in its entirety.

BACKGROUND OF THE INVENTION

1. Field of the Invention

The present invention relates generally to buffer amplifiers, and more particularly, to methods and systems for dynamically optimizing an I/O receiver performance for the current, local temperature of the I/O receiver.

2. Description of the Related Art

Integrated circuits (ICs) typically have thermal gradients across the IC. The thermal gradients are typically caused by different functions being carried out in one portion of the IC than in another portion of the IC because the different functions can lead to variations in power dissipation across the IC. FIG. 1A shows a temperature gradient across a typical microprocessor die 100. The hottest area 102 can have a relatively high operating temperature such as about 105 degrees C. or higher. An adjacent area 104 is slightly cooler at approximately 80 degrees C. An even cooler area 106 is approximately 50 degrees C. The remaining area 108 is approximately 20 degrees C.

The hottest area 102 can include portions of the core processor unit, which perform functions nearly every clock cycle. By comparison, some of the ancillary portions of the microprocessor die 100, such as memory registers and other, non-core functions, operate at cooler temperatures because these ancillary portions may not perform a function every clock cycle or for other reasons described below. As a result, these ancillary portions are typically cooler areas of the microprocessor die 100.

Some portions of the microprocessor die 100 may also have higher device densities than other portions of the microprocessor die 100. The higher density portions, such as the processing core, would typically have a higher temperature than less dense areas 104, 106, 108, because more operations and current flow occurs in higher device density areas. Therefore a temperature gradient can often result between the different areas 102, 104, 106, 108 of the microprocessor die 100.

Temperature variations (i.e., gradients) between different I/O receivers can cause the different I/O receivers to switch at different times. As a result, the outputs of the different I/O receivers do not switch at the same time and therefore a longer sampling time (i.e., delay) is required to accurately collect the output data from all of the I/O receivers. The longer sampling delay reduces the total data throughput from all of the I/O receivers.

Amplifiers such as I/O receivers and others are typically constructed from MOS transistors (NMOS and PMOS). The current flow, $I_d$ through a saturated MOS transistor can determined by the following Relationship 1:

$$I_d = 1/2 * u * C_{ox} * W/L * (V_{gs} - V_t)^2 \qquad \text{Relationship 1}$$

u is the mobility of electrons in NMOS (or holes in PMOS). $C_{ox}$ is the gate electrode capacitance. W/L are the physical dimensions of the device. $V_{gs}$ is the gate-source voltage applied across the gate-source junction. $V_t$ is equal to bias voltage as will be described below. $V_t$ is the turn-on, or threshold voltage. By way of example, as temperature goes up, the mobility parameter will shift according to the following Relationship 2:

$$u = u_o(300/T)^{3/2} \qquad \text{Relationship 2}$$

$u_o$ is the mobility of electrons (or holes) @ 300 Kelvin. As T goes up, u goes down. Also as u goes down, physically larger device dimensions (W/L) are required to maintain the same level of current as shown above in Relationship 1. However, when larger devices are used, the relative current must be increased even more due to the additional capacitance resulting from the physically larger devices. Capacitance is typically proportional to physical area of the devices.

The time required for an amplifier such as a I/O receiver to switch (i.e., switching time ($\Delta T$)) is defined by the following Relationship 3:

$$\Delta V = (I * \Delta T)/C \qquad \text{Relationship 3}$$

Where $\Delta V$ is the change in voltage across the capacitance C of a node and I is a charging or discharging current across the capacitance C. As shown in Relationship 3 above, the switching time is proportional to the capacitance of the node or device junction in the amplifier. Therefore, as the capacitance increases the switching time also increases.

As described above in FIG. 1A and Relationships 1-3, temperature variations (i.e., gradients) between different I/O receivers can cause the different I/O receivers to switch at different times. By way of example, FIG. 1B shows a typical multi-bit bus 120 connected to the microprocessor die 100. The multi-bit bus 120 is a 64-bit bus and includes 64 different bit lines 122A-122LLL. Each of the bit lines 122A-122LLL has a dedicated I/O receiver 124A-124LLL. A significant temperature gradient can occur across the 64 I/O receivers 124A-124LLL. The 64-bit bus 120 also includes a single clock signal 128 that is used to synchronize the data sampling from each of the 64 bit lines 122A-122LLL. The clock signal 128 is delayed 90-degrees in a clock delay circuit 130. The 90-degree delayed clock signal is coupled to the sample and hold circuits 126A-126LLL.

FIG. 1C is a timing diagram 150 of the clock signal 128 and the data signals on bit lines 122A, 122LLL. Typically, the clock signal 128 is delayed 90-degrees so as to maximize the probability of detecting the desired data signal on each I/O receiver 124A-124LLL. Simply put, the 90-degree delayed clock signal provides each I/O receiver 124A-124LLL a 90-degree timeframe to detect the respective data signal 122A-122LLL and switch the output of the I/O receiver 124A-124LLL according to the corresponding detected data signal 122A-122LLL.

As shown in FIG. 1C, a temperature gradient across the 64 I/O receivers 124A-124LLL can delay the 64 separate data signals 122A-122LLL varying amounts such as 30-degrees delayed in I/O receiver 122A and 40 degrees advanced in I/O receiver 122LLL. The 90-degree delayed clock signal 132 allows the correct signal from each of the bit streams 122A, 122LLL to be accurately detected at time T1. Conversely at time T0, the data signal 122A has not yet switched as the data signal 122A is delayed 30-degrees due to a temperature gradient. As a result, the total data throughput (bit rate) of the 64-bit bus 120 is reduced because additional time is required to accurately resolve each data bit. What is needed is a method and system for correcting each I/O receiver 124A-124LLL according to the local temperature of each I/O receiver 124A-124LLL so as to equalize all propagation delays or advances in the I/O receivers 124A-124LLL.

Designing all I/O receivers to operate at 105 degrees C. when not all of the I/O receivers will actually operate at 105 degrees C. will unnecessarily increase the size of the devices required, increase the internal node capacitances leading to increased switching time. Further, the larger physical device sizes of the I/O receivers designed to operate at 105 degrees C. limit the possible locations of the I/O receivers.

Another problem specific to some ICs, such as a microprocessor and other processor-type ICs is that depending upon the actual function being performed, the temperature gradients may migrate around the IC. For example, a first portion of the IC may be very hot when performing a first function. Alternatively, when the IC is performing second function, the first portion may be substantially cooler because another portion of the IC is performing the bulk of the second function. Therefore, it is not efficient to design I/O receivers in a first portion of the IC to be optimized for operating at 20 degrees C. and I/O receivers in a second portion of the IC to be optimized for operating at 105 degrees C. when the actual operating temperatures of each portion of the IC can vary significantly.

Further still, as device densities have increased, the temperature gradients have similarly increased. By way of example, some current generations of ICs have temperature gradients as much as 50 degrees C. or more across the IC. In one current generation CPU the operating temperature can be 105 degrees C. or hotter in the hotter portions of the CPU and 50 degrees C. or less in the "cooler" portions of the CPU. Designing I/O receivers throughout the entire CPU to operate at 105 degrees C. is very inefficient use of power and also results in slower switching (i.e., lower speed) I/O receivers, which degrades overall CPU performance as described above.

In view of the foregoing, there is a need for a system and method for adjusting the amplification control parameters for each I/O receiver I/O receiver according to the local thermal characteristics of the I/O receiver.

SUMMARY OF THE INVENTION

Broadly speaking, the present invention fills these needs by a dynamically optimizing I/O receiver performance for the current, local temperature of the I/O receiver. It should be appreciated that the present invention can be implemented in numerous ways, including as a process, an apparatus, a system, or a device. Several inventive embodiments of the present invention are described below.

A system and method of adjusting an I/O receiver includes providing an amplification control parameter to the I/O receiver. A temperature of the I/O receiver is monitored and the amplification control parameter to the I/O receiver is adjusted according to the temperature of the I/O receiver.

The amplification control parameter can include a bias voltage. The bias voltage can be provided by an adjustable bias voltage source.

In one embodiment a temperature monitoring system can monitor the temperature of the I/O receiver and adjust the amplification control parameter to the I/O receiver according to the temperature of the I/O receiver includes determining a temperature correction signal and applying the temperature correction signal to the adjustable bias source.

The temperature correction signal can include providing a look-up table that includes a first temperature and a second temperature. The look-up table also includes a first temperature correction signal that corresponds to the first temperature and a second temperature correction signal that corresponds to the second temperature.

The temperature correction signal can include providing a look-up table that includes at least two temperatures and a corresponding temperature correction signal for each of the least two temperatures. If the temperature of the I/O receiver is a third temperature that is between the first temperature and the second temperature, and a third temperature correction signal corresponds to the third temperature, the third temperature correction signal can be interpolated from the first temperature correction signal and the second temperature correction signal.

Applying the temperature correction signal to the adjustable bias source can include outputting an n-bit temperature correction signal from the temperature monitoring system and receiving the n-bit temperature correction signal in the adjustable bias source.

Adjusting the bias voltage to the I/O receiver according to the temperature of the I/O receiver can include converting the n-bit temperature correction signal in the adjustable bias source to an adjust voltage. The adjust voltage can be added to a constant voltage to produce an adjusted bias voltage.

The amplification control parameter can include a bias current.

One embodiment includes an integrated circuit that includes several I/O receivers that are distributed about the integrated circuit. Each one of the I/O receivers includes a control input. The integrated circuit also includes a distributed temperature sensor system capable of monitoring multiple local temperatures that correspond to each of the I/O receivers. The distributed temperature sensor system has an output coupled to the control input of the corresponding I/O receivers.

The distributed temperature sensor system can include a processor having a control output signal that is coupled to the control input of each of the corresponding I/O receivers and multiple temperature sensors that each are co-located with at least one I/O receiver, the temperature sensors can be coupled to the processor. The control output signal corresponds to the local temperature of the corresponding I/O receiver.

The processor can be external to the integrated circuit.

The distributed temperature sensor system is capable of outputting a digital control input signal to the control input of each of the least one corresponding I/O receivers.

In one embodiment, each of the I/O receivers can include an adjustable current source, each one of the adjustable current sources has a bias input. An adjustable bias source that has an output coupled to the corresponding bias input. Each of the corresponding, adjustable bias sources can have a bias control input coupled to the I/O receiver control input.

The bias input can determine a current flow through the current source.

In one embodiment, each of the corresponding, adjustable bias sources can include a constant voltage circuit and a voltage adjuster. An output of the constant voltage circuit and an output of the voltage adjuster can be coupled to the adjustable bias source output.

The constant voltage circuit can include a voltage divider.

The voltage adjuster can include a digital to analog converter.

The voltage adjuster can receive a digital control signal from the distributed temperature sensor system and output an adjusting voltage. An adjustable bias source output voltage can equal a sum of the output voltage of the constant voltage circuit and the adjusting voltage.

Another embodiment includes a microprocessor. The microprocessor includes multiple I/O receivers that are distributed about the microprocessor. Each one of the I/O receivers can include an adjustable current source. Each one of the adjustable current sources having a bias input. Each one of the I/O receivers can also include a corresponding, adjustable bias source that has an output coupled to the corresponding bias input. Each of the corresponding, adjustable bias sources has a control input. The microprocessor also includes a distributed temperature sensor system capable of monitoring multiple local temperatures that correspond to each of the I/O receivers. The distributed temperature sensor system has an output coupled to the control input of the corresponding adjustable bias sources.

The present invention provides the advantage of dynamically adjusting the operation of the I/O receivers according to the local temperature of each of the I/O receivers.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments for dynamically optimizing I/O receiver I/O receiver performance for the current, local temperature of the I/O receiver will now be described. It will be apparent to those skilled in the art that the present invention may be practiced without some or all of the specific details set forth herein.

As described above, various types of amplifiers can be distributed throughout an IC die as the amplifiers are used for many purposes in the IC. By way of example, one common type of amplifier is an I/O receiver. An I/O receiver can be used to detect and amplify data on a data bus or between two portions of an IC or other buffering functions in the IC.

Figure 1A:
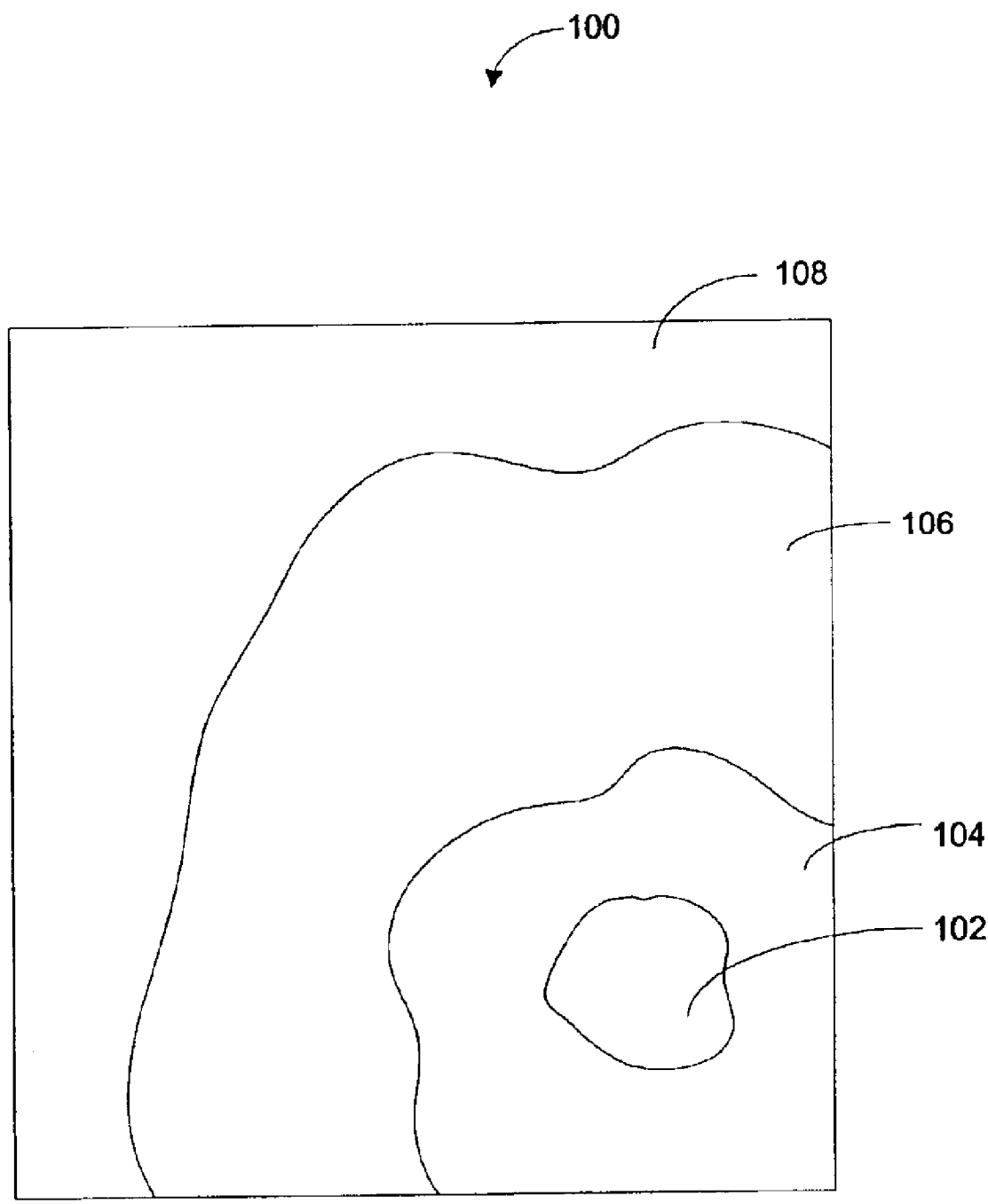
FIG. 1A shows a temperature gradient across a typical microprocessor die.
Figure 1B:
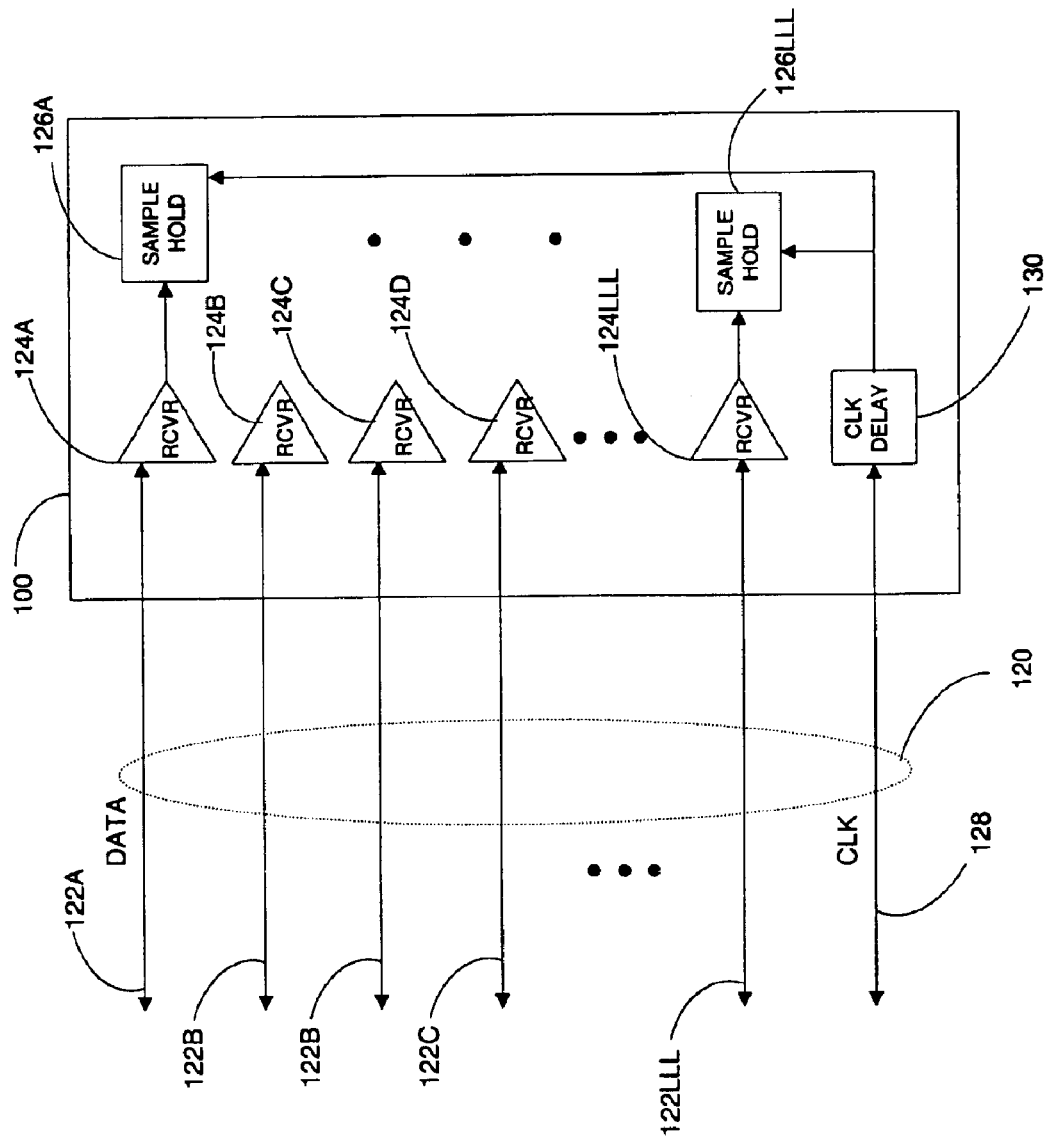
FIG. 1B shows a typical multi-bit bus connected to the microprocessor die.
Figure 1C:
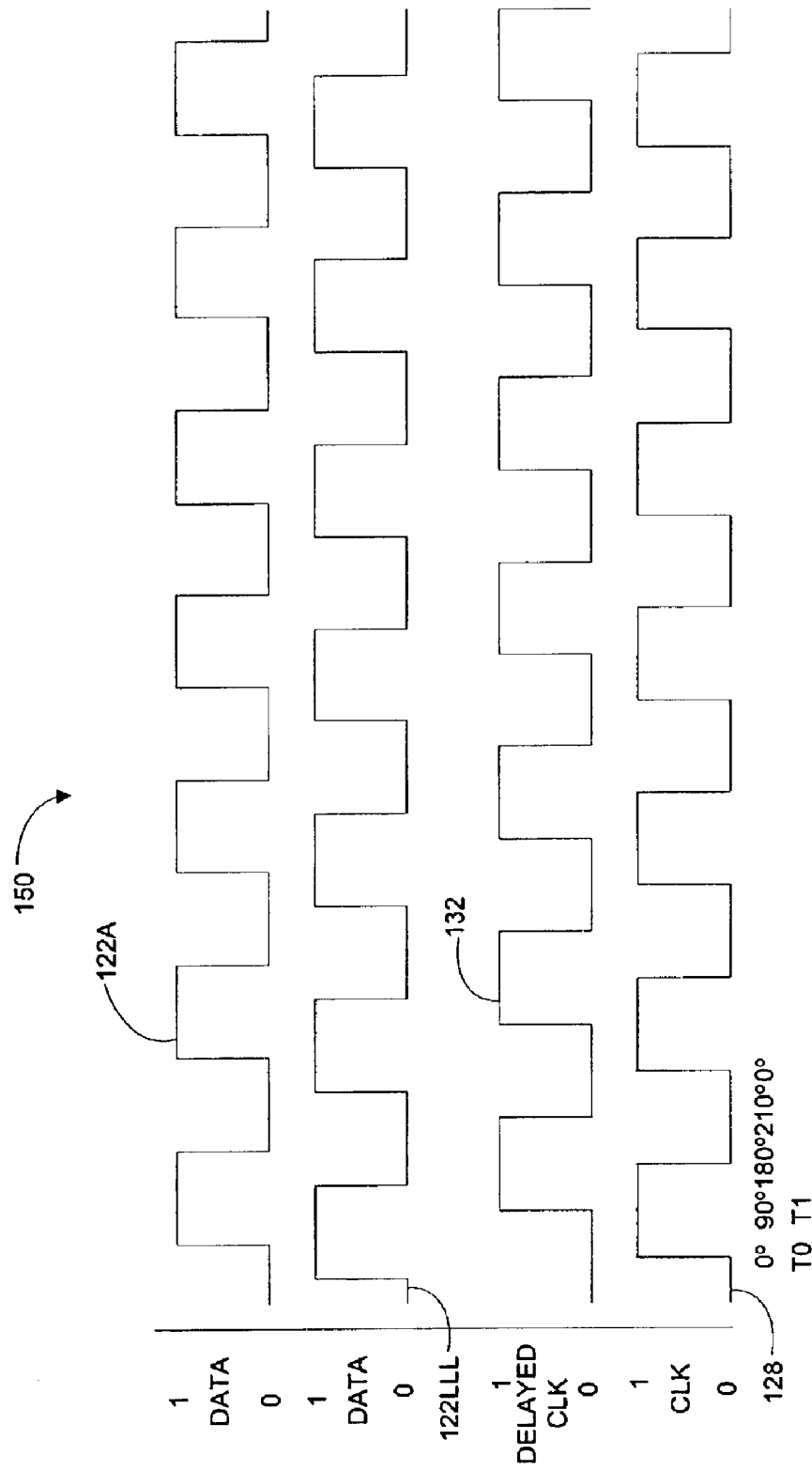
FIG. 1C is a timing diagram of the clock signal and the data signals on bit lines.
Figure 2A:
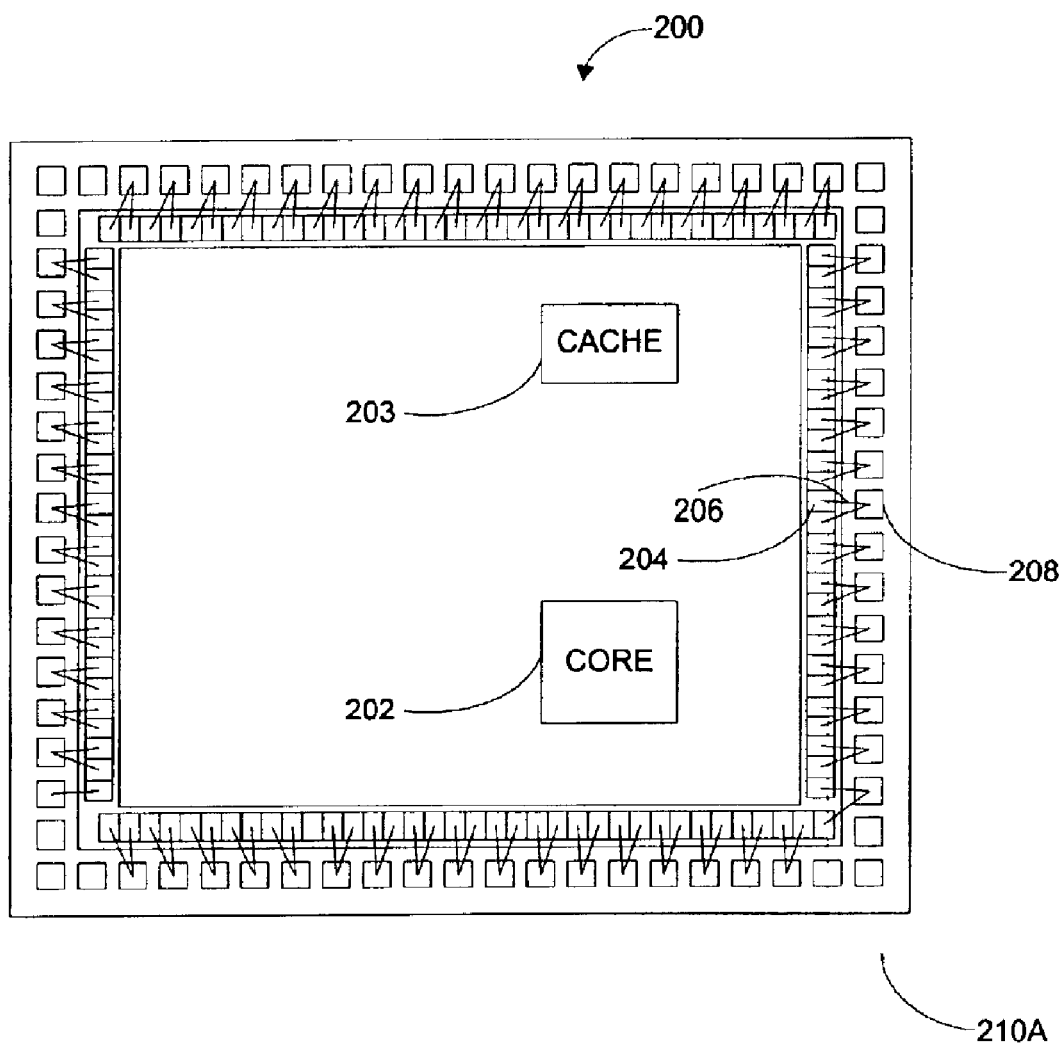
FIG. 2A is a block diagram of a microprocessor according to one embodiment of the present invention.

FIG. 2A is a block diagram of a microprocessor 200 according to one embodiment of the present invention. The microprocessor 200 includes a processing core 202 and other functional portions such as cache memory 203, and several I/O receivers 204 that provide a data interface between the microprocessor 200 and other devices and components that are external to the microprocessor 200. A package layer 210 includes the wire 206 and a larger connection pad 208 used to connect the I/O receiver 204 and the external devices and components (not shown).

Figure 2B:
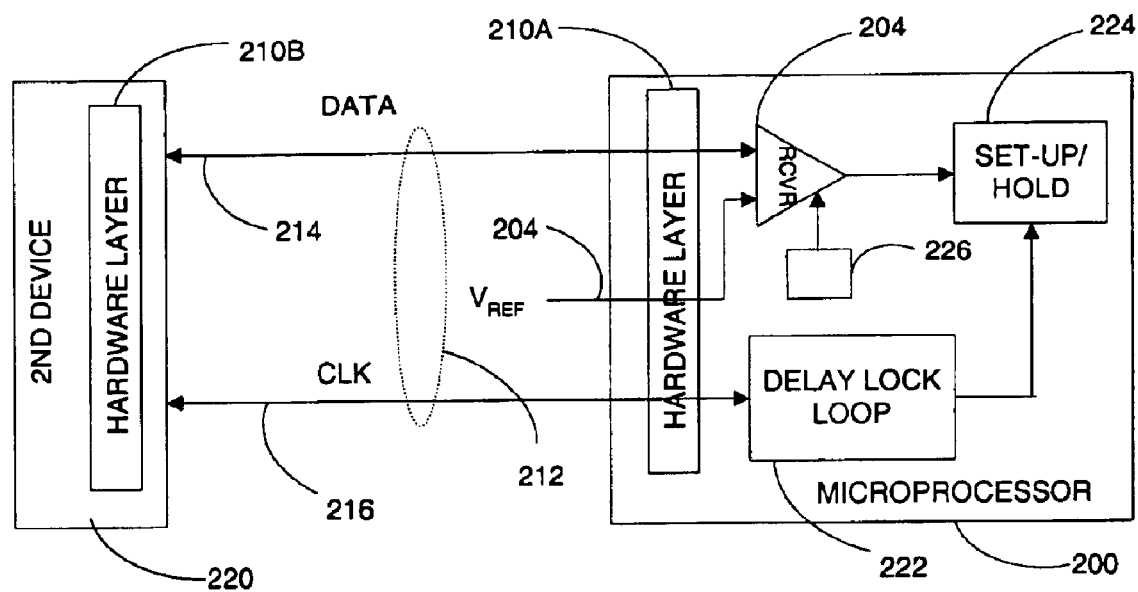
FIG. 2B is a block diagram of a data bus and microprocessor according to one embodiment of the present invention.

FIG. 2B is a block diagram of a data bus 212 and microprocessor 200 according to one embodiment of the present invention. The microprocessor 200 is coupled to a second device 220 by a data bus 212. The data bus 212 includes a data line 214 and a clock signal line 216. The second device 220 can include an ASIC processor or a memory device or other external device that must exchange data with the microprocessor 200. The second device 210 also includes a hardware layer 210B. The microprocessor 200 includes an I/O receiver 204 and a setup and hold circuit 224 and a delay lock loop 222. The delay lock loop 222 synchronizes the clock signal and outputs a 90-degree delayed clock signal to the setup and hold circuit 224. The I/O receiver 204 receives a data pulse from the data line 214 and compares the data with a reference voltage ($V_{REF}$) 204. The I/O receiver 204 outputs the difference of the data line 214 and the $V_{REF}$ 204 to the setup and hold circuit 224. As the setup and hold circuit 224 receives the 90-degree delayed clock signal, the setup and hold circuit 224 outputs a data pulse that corresponds to the data level on the output from the I/O receiver 204. The 90-degree delayed clock signal provides a sufficient sampling delay so as to maximize the probability of meeting both set-up and hold constraints at the I/O receiver 204 and provide a consistent bit rate that can be accurately resolved by the I/O receiver 204.

The performance of the I/O receiver 204 is controlled by several amplification control parameters such as bias voltage and bias current. The bias voltage is a nominal constant voltage from a bias voltage source 226. Each I/O receiver 204 can have an individual bias voltage source so as to minimize any common mode signals from the output from the I/O receiver 204. The actual bias voltage required is dependant on the type of I/O receiver 204 device. In one typical I/O receiver 204 device, the bias voltage is typically 0.5 VDC.

Figure 3A:
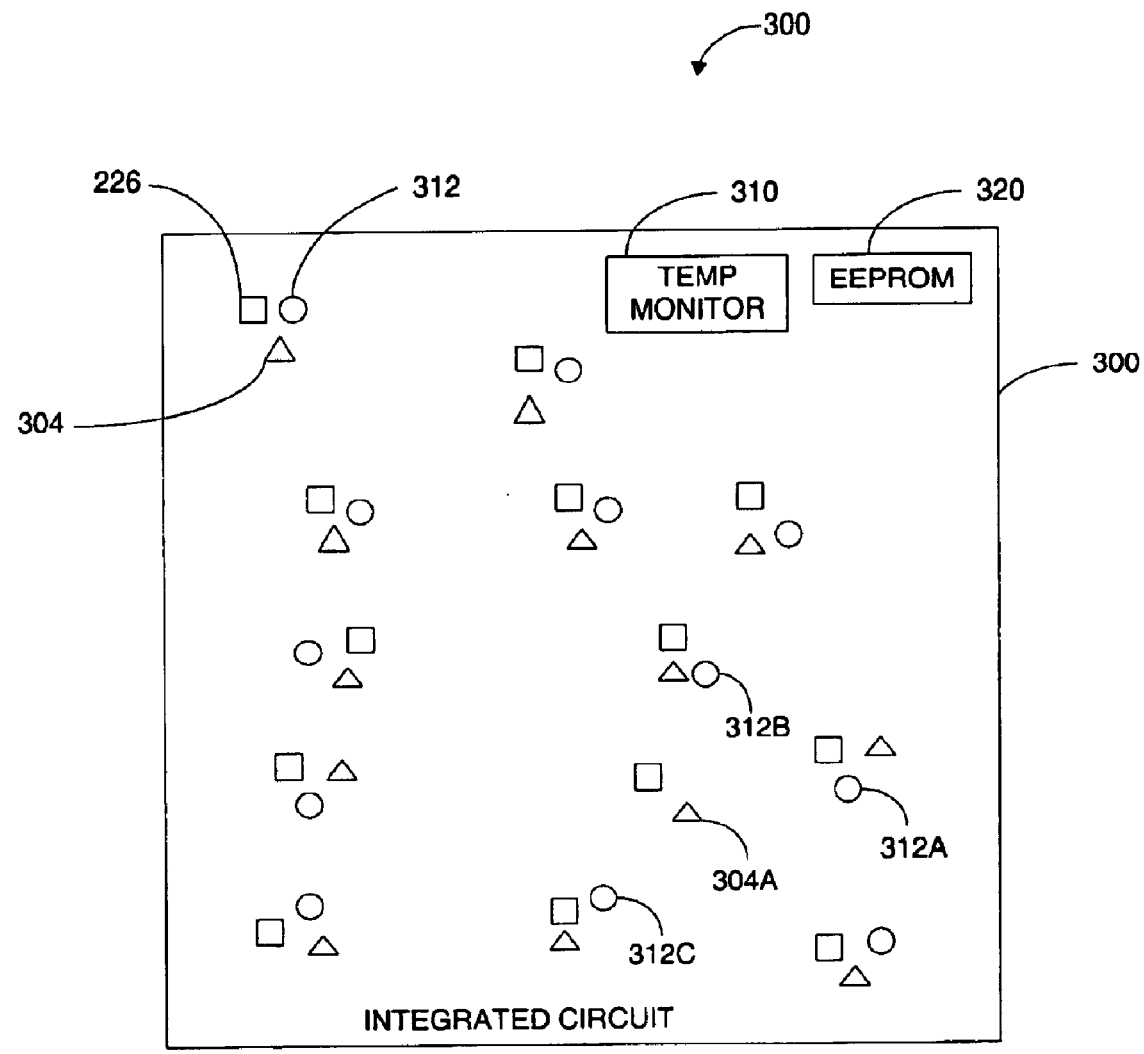
FIG. 3A shows a block diagram of an IC die that includes a distributed temperature monitoring system, according to one embodiment of the present invention.

As described above, the microprocessor can suffer significant temperature gradients across the microprocessor. FIG. 3A shows a block diagram of an IC die 300 that includes a distributed temperature monitoring system, according to one embodiment of the present invention. Multiple bias voltage sources 226 are represented by multiple small squares that are distributed around the IC die 300. The, multiple bias voltage sources 226 are distributed around the IC die 300 so as to be local to various I/O receivers 304 (or sets of I/O receivers) that are also distributed around the IC die 300. The various I/O receivers 304 are represented by triangles.

The temperature monitoring system includes a temperature monitoring unit or processor or controller 310 and multiple temperature sensors 312 that are distributed around the IC die 300. The multiple temperature sensors 312 may be co-located with the multiple I/O receivers 304. Alternatively, if a temperature sensor is not co-located with an I/O receiver such as I/O receiver 304A, then a local temperature of 110 receiver 304A can be approximated by the temperature monitoring unit 310, and the detected temperature from one or more temperature sensors 312A-C that are nearby the I/O receiver 304A.

The temperature monitoring unit 310 can be a specially designed portion of the IC die 300 or maybe included in another functional portion of the IC die 300. By way of example, if the IC die 300 is a microprocessor, the processing portion of the temperature monitoring unit 310 may be included in the main processing core of the microprocessor. In an alternative embodiment, the temperature monitoring unit 310 can be external to the IC die 300 such as in a peripheral IC or even an IC remotely coupled to the IC die 300 by a communications network such as a computer network.

Additional details of the temperature monitoring system are described in commonly owned U.S. patent application Ser. No. 10/079,476 filed on Feb. 19, 2002 and entitled "Method and System for Monitoring and Profiling IC Die Temperature," by inventors Spencer Gold, Claude Gauthier, Steven Boyle, Kenneth House and Joseph Siegel, which is incorporated by reference herein, in its entirety.

Figure 3B:
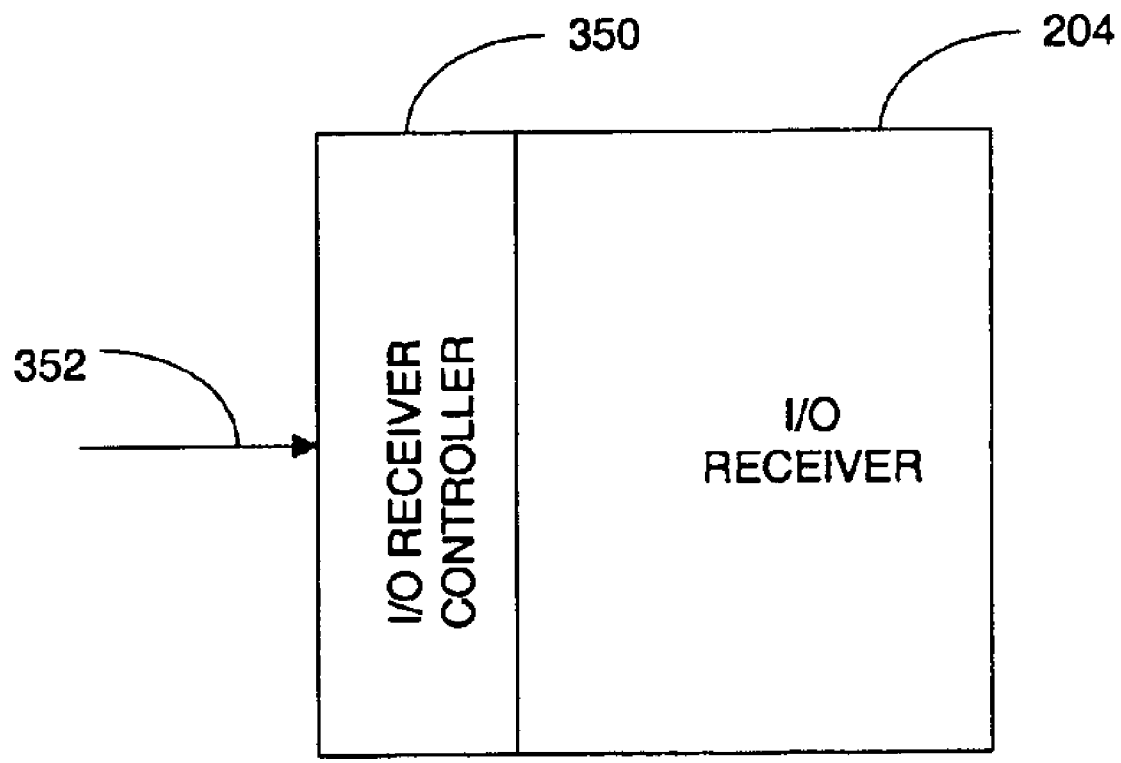
FIG. 3B is a block diagram of an I/O receiver in accordance with one embodiment of the present invention.

FIG. 3B is a block diagram of an I/O receiver 204 in accordance with one embodiment of the present invention. The I/O receiver 204 can be coupled to an I/O receiver controller 350. The I/O receiver controller 350 includes a control input 352. The control input 352 can be connected to the temperature monitoring system. The temperature monitoring system can output a local temperature correction signal to the I/O receiver controller 350. The I/O receiver controller 350 can adjust the operation of the I/O receiver 204 by adjusting the amplification parameters of the I/O receiver 204.

Figure 4:
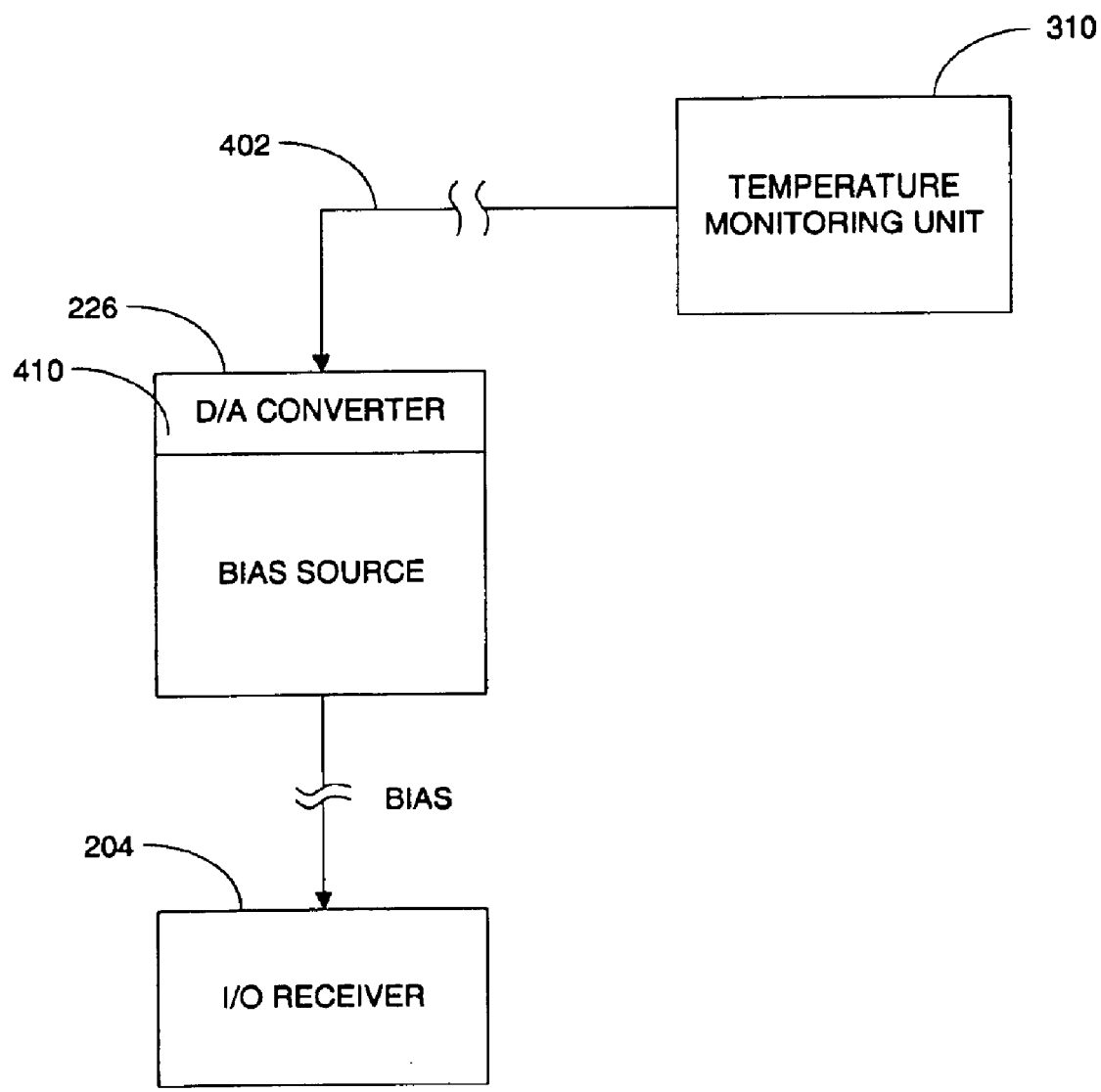
FIG. 4 shows a block diagram of the interconnections between a temperature monitoring unit, a bias voltage source and an I/O receiver according to one embodiment of the present invention.
Figure 5:
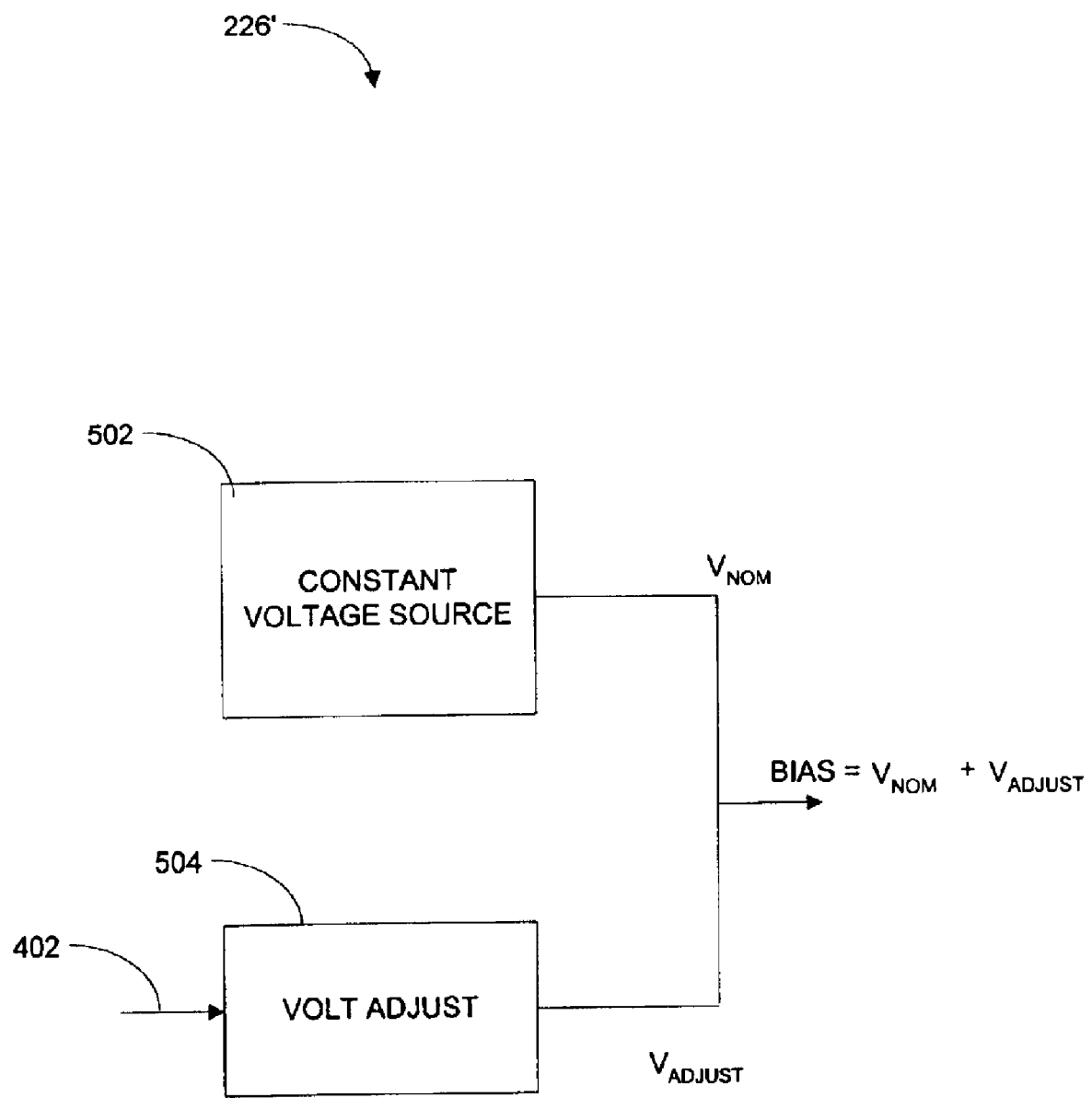
FIG. 5 is a block diagram of a bias voltage source according to one embodiment of the present invention.

FIGS. 4 and 5 below describe embodiments where the I/O receiver controller 350 includes a bias voltage source 226 that adjusts the bias voltage to adjust the operations of the I/O receiver 204 according to the local temperature. However, in alternative embodiments, the I/O receiver controller 350 can also include a bias current source that adjusts the bias current or other amplification parameters to adjust the operations of the I/O receiver 204 according to the local temperature.

FIG. 4 shows a block diagram of the interconnections between a temperature monitoring unit 310, a bias voltage source 226 and an I/O receiver 204 according to one embodiment of the present invention. The temperature monitoring unit 310 receives the corresponding temperature from each of the temperature sensors 312. The temperature monitoring unit 310 can then output a corresponding temperature correction signal to each of the multiple bias voltage sources 226. Each of the multiple bias voltage sources 226 can adjust the respective output bias voltage in response to the received temperature correction signal.

The bias voltage source 226 can be coupled to the temperature monitoring unit 310 by way of a bus or other commonly known methods. The bus between the temperature monitoring unit 310 and the bias voltage source 226 can be a dedicated bus or a bus that is shared by the various bias voltage sources 226 and possibly other devices (not shown).

Each bias voltage source 226 can also include an address such that a particular temperature correction signal 402 can also include an address portion that corresponds with a particular bias voltage source 226 so that the particular temperature correction signal 402 can be addressed to a particular bias voltage source 226. This allows individual adjustment of each of the bias voltage sources 226 according to the corresponding local temperature of the bias voltage sources 226 so that all bias voltage sources are not given the same temperature correction signal.

The bias voltage source 226 outputs an adjusted bias voltage to the I/O receiver 204 in response to the temperature correction signal 402. The bias voltage source 226 can use any system or method known in the art to use the temperature correction signal 402 to control the variable, output bias voltage. The temperature correction signal 402 can be a digital or an analog signal.

In one embodiment the bias voltage source 226 includes a digital to analog (D/A) converter 410 to convert a digital n-bit temperature correction signal 402. In another example, a D/A converter 410 can convert a digital, n-bit temperature correction signal 402 to an analog bias signal used to produce the variable output bias voltage. Alternatively, the D/A converter 410 can include a look-up table to reference a bias voltage level that is used to produce the desired output bias voltage. By way of example, a temperature correction signal 402 of "10110001" corresponds, in a lookup table, to a voltage of 0.3075 VDC so that the output voltage of the bias voltage source 226 will be adjusted to produce a temperature corrected current in the constant current source of the corresponding I/O receiver (or I/O receivers).

Alternatively, the temperature correction signal 402 could be the actual local temperature of the bias voltage source 226 and the temperature correction signal 402 can be correlated to a voltage in a look-up table. Conversely, temperature monitoring unit 310 can determine the precise temperature correction signal 402 such as by way of a look-up table or according to an algorithm or other methods known in the art. The resulting temperature correction signal 402 can be provided to the D/A converter 410, which directly converts the received temperature correction signal 402 to an analog biasing or adjusting signal for the bias voltage source 226. In one embodiment the temperature correction 402 signal is determined by an algorithm for interpolating between two known temperatures.

For example a first temperature correction signal corresponds to operating a particular bias voltage source 226 at 25 degrees C. A second temperature correction signal corresponds to operating the particular bias voltage source 226 at 105 degrees C. If a detected actual temperature is 65 degrees C., then some manner of interpolation is required to determine a corresponding temperature correction signal. In one embodiment a simple linear scale could be used to interpolate. Alternatively a non-linear scale could be used. The type of scale selected could be determined by one or more parameters of the IC die 300.

The precise values to the look-up tables and temperature processing algorithms described above can be determined by one or more parameters of the IC die 300. In one embodiment the parameters are included or stored on the IC die 300, such as in an EEPROM 320 portion of the IC die 300, or other methods of recording the parameters on or in the IC die 300 or in accompanying integrated circuits or software, that could be read by the temperature monitoring unit 310. The parameters of the IC die 300 can include temperature performance and capability factors such as may be determined in production testing. The parameters of the IC die 300 can be stored in the EEPROM 320 portion as part of the production cycle. By way of example, upon initial power up of the IC die 300, the temperature monitoring unit 310 can read the parameters of the IC die 300 from the EEPROM 320 portion so that appropriate temperature correction techniques can be applied to the various locales of the IC die 300. The above example methods are intended to be examples only and the invention should not be limited to these embodiments.

FIG. 5 is a block diagram of a bias voltage source 226' according to one embodiment of the present invention. A constant voltage source 502 produces a constant nominal voltage out $V_{nom}$. A voltage adjuster 504 is coupled in parallel with the constant voltage source 502. The voltage adjuster 504 receives the temperature correction signal 402 and outputs a $V_{adjust}$ voltage. An output bias voltage is equal to the sum of $V_{adjust}$ and $V_{nom}$. In this embodiment, $V_{nom}$ is a setpoint voltage about which the temperature correction signal 402 adjusts the output bias voltage. The value of $V_{nom}$ is dependant on the particular semiconductor device type and material. By way of example in one type of semiconductor device, the $V_{nom}$ is equal to about 0.25 VDC and $V_{adjust}$ is equal to about +1-0.075 VDC yielding a range of bias voltage from about 0.175 VDC to about 0.325 VDC.

Rather than adjusting bias voltage above and below a set point voltage, an alternative bias voltage source 226' could be an adjustable voltage source that is independent of a particular setpoint.

The bias voltage source 226 varies the bias voltage to compensate for the local temperature characteristics of the local I/O receiver 204 that the bias voltage source 226 supplies bias voltage to. The result is the bias voltage for the I/O receiver 204 is adjusted slightly up or down which slightly changes the current "constant current" $I_{BIAS}$ for the I/O receiver. The adjusted $I_{BIAS}$ for the I/O receiver 204 adjusts the slew rate and the gain of the I/O receiver 204 according to the temperature of the I/O receiver 204.

It should be appreciated that there are multiple local sets of bias voltage sources 226 and corresponding I/O receiver 204 and that each local set of a bias voltage source 226 and I/O receiver 204 can have a different bias voltage that is optimized for the actual temperature of the I/O receiver 204.

Figure 6:
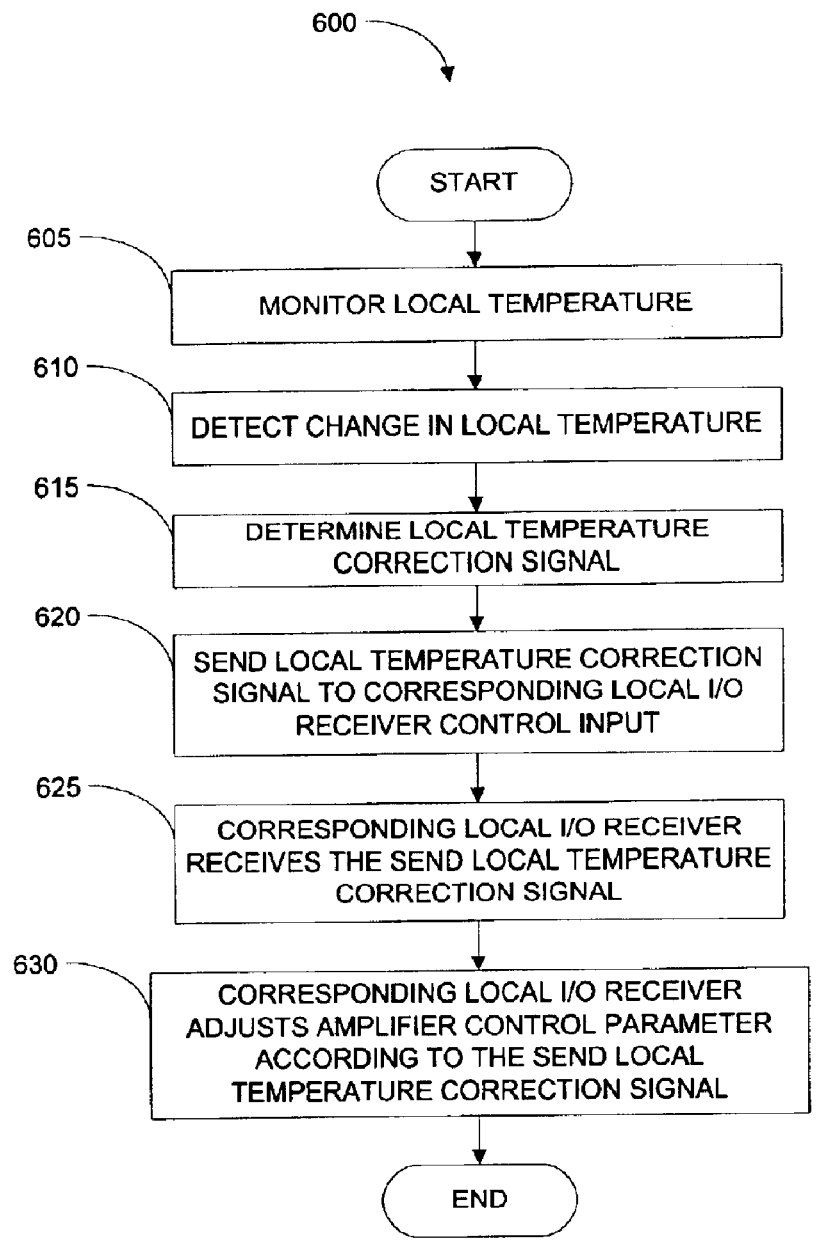
FIG. 6 is a flowchart of the method operations of optimizing the operation of an I/O receiver according to the local temperature of the I/O receiver in accordance with one embodiment of the present invention.

FIG. 6 is a flowchart of the method operations 600 of optimizing the operation of an I/O receiver according to the local temperature of the I/O receiver in accordance with one embodiment of the present invention. In operation 605, the local temperature is monitored by the temperature monitoring system such as described above. In operation 610, a change in the temperature in a local area of the IC die, that includes one or more I/O receivers 204, is detected.

The temperature monitoring unit 310 determines a temperature correction signal 402 in operation 615. The temperature monitoring unit 3110 outputs a temperature correction signal 402 to the corresponding I/O receiver controller or control input, in operation 620.

In operation 625, the temperature correction signal 402 is received in the corresponding I/O receiver. In operation 630, the I/O receiver adjusts operation according to the local temperature correction signal. In one embodiment, the local bias voltage source 226 can receive the temperature correction signal and adjust the bias voltage as described above. The adjusted bias voltage is then output to the local I/O receiver 204 so as to adjust the operation of the I/O receiver 204. Alternatively, the bias current or other amplification control parameters of the I/O receiver 204 could be adjusted according to the local temperature correction signal.

As described above in FIGS. 1A-1C, 2A and 2B, and Relationships 1-3, temperature gradients between different I/O receivers can cause the different I/O receivers to switch at different times resulting in different net sampling delay times which reduces the effective bit rate of each data line on the bus 212. By manipulating the various amplification control parameters of each I/O receiver on the bus 212, each I/O receiver can be individually adjusted to correct and compensate for any temperature gradient caused delays so that the net delay is substantially equal to 90-degrees which thereby allows the data on all of the data lines to be resolved within a very short time period so that the bit rate of the bus 212 can be maximized.

While the disclosed invention is described in terms of bias voltages being used to manipulate the corresponding biased currents, it should be appreciated that in various alternative embodiments of the present invention that include various materials and device types such as a PBIAS or an NBIAS voltage could also be used to manipulate the corresponding biased currents. Further, describing the invention in terms of bias voltages are merely exemplary embodiments and are not intended to exclude alternative embodiments that include manipulating bias current of the I/O receiver or power supply of the I/O receiver or other amplification control parameters of the I/O receiver. As used herein the term "about" means+/-10%. By way of example, the phrase "about 250" indicates a range of between 225 and 275.

Various aspects of the invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices.

It will be further appreciated that the instructions represented by the operations in FIG. 6 are not required to be performed in the order illustrated, and that all the processing represented by the operations may not be necessary to practice the invention. Further, the processes described in FIG. 6 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

1. A method of adjusting an I/O receiver comprising:
providing an amplification control parameter to the I/O receiver;
monitoring a temperature of the I/O receiver;
producing an n-bit temperature correction signal that corresponds to the temperature of the I/O receiver; and
adjusting the amplification control parameter to the I/O receiver according to the n-bit temperature correction signal.

2. The method of claim 1, wherein the amplification control parameter includes a bias voltage.

3. The method of claim 2, wherein the bias voltage is provided by an adjustable bias voltage source.

4. The method of claim 1, wherein a temperature monitoring system monitors the temperature of the I/O receiver and adjusting the amplification control parameter to the I/O receiver according to the n-bit temperature correction signal includes:

determining a temperature correction signal.

5. The method of claim 4, wherein determining the temperature correction signal includes providing a look-up table that includes a first temperature and a second temperature and a first n-bit temperature correction signal that corresponds to the first temperature and a second n-bit temperature correction signal that corresponds to the second temperature.

6. The method of claim 4, wherein determining the n-bit temperature correction signal includes providing a look-up table that includes at least two temperatures and a corresponding n-bit temperature correction signal for each of the least two temperatures.

7. The method of claim 6, wherein if the temperature of the I/O receiver is a third temperature that is between the first temperature and the second temperature, and a third temperature correction signal corresponds to the third temperature, the third temperature correction signal being interpolated from the first temperature correction signal and the second temperature correction signal.

8. The method of claim 4, wherein the n-bit temperature correction signal is output from the temperature monitoring system.

9. The method of claim 3, wherein adjusting the bias voltage to the I/O receiver according to the temperature of the I/O receiver includes converting the n-bit temperature correction signal in the adjustable bias source to an adjust voltage.

10. The method of claim 9, wherein the adjust voltage is added to a constant voltage to produce an adjusted bias voltage.

11. The method of claim 1, wherein the amplification control parameter includes a bias current.

12. An integrated circuit comprising:

a plurality of I/O receivers that are distributed about the integrated circuit, each one of the I/O receivers including a control input; and a distributed temperature sensor system capable of monitoring a plurality of local temperatures that correspond to each of the plurality of I/O receivers and having an output coupled to the control input of the corresponding I/O receivers, wherein the distributed temperature sensor system is capable of outputting an n-bit temperature control input signal to the control input of each of the at least one corresponding I/O receivers.

13. The integrated circuit of claim 12, wherein the distributed temperature sensor system includes:

a processor having a control output signal that is coupled to the control input of each of the corresponding I/O receivers; and a plurality of temperature sensors that each are co-located with at least one I/O receiver, the plurality of temperature sensors being coupled to the processor, wherein the control output signal corresponds to the local temperature of the corresponding I/O receiver.

14. The integrated circuit of claim 13, wherein the processor is external to the integrated circuit.

15. The integrated circuit of claim 12, wherein each of the plurality of I/O receivers includes:

an adjustable current source, each one of the adjustable current sources having a bias input; and an adjustable bias source that has an output coupled to the corresponding bias input, each of the corresponding, adjustable bias sources having a bias control input coupled to the I/O receiver control input.

16. The integrated circuit of claim 15, wherein the bias input determines a current flow through the current source.

17. The integrated circuit of claim 16, wherein each of the corresponding, adjustable bias sources includes:

a constant voltage circuit; and a voltage adjuster, an output of the constant voltage circuit and an output of the voltage adjuster being coupled to the adjustable bias source output.

18. The integrated circuit of claim 17, wherein constant voltage circuit includes a voltage divider.

19. The integrated circuit of claim 17, wherein the voltage adjuster includes a digital to analog converter.

20. The integrated circuit of claim 17, wherein the voltage adjuster is capable of receiving a n-bit temperature control input signal from the distributed temperature sensor system and outputting an adjusting voltage.

21. The integrated circuit of claim 20, wherein an adjustable bias source output voltage equals a sum of the output voltage of the constant voltage circuit and the adjusting voltage.

22. A microprocessor comprising:

a plurality of I/O receivers that are distributed about the microprocessor, each one of the IYO receivers including:

an adjustable current source, each one of the adjustable current sources having a bias input; and a corresponding, adjustable bias source that has an output coupled to the corresponding bias input, each of the corresponding, adjustable bias sources having a control input; and a distributed temperature sensor system capable of monitoring a plurality of local temperatures that correspond to each of the plurality of I/O receivers and having an output coupled to the control input of the corresponding adjustable bias sources, wherein the distributed temperature sensor system is capable of outputting an n-bit temperature control input signal to the control input of each of the at least one corresponding adjustable bias sources.

* * * * *